United States Patent
Wirth et al.

[15] 3,701,392
[45] Oct. 31, 1972

[54] FLAT VIBRATING MEASURING STRING

[72] Inventors: Walter Wirth, Uitikon, Zurich, Switzerland; Burkhart Kuhl, Karlsruhe, Germany

[73] Assignee: August Sauter KG, Ebingen, Germany

[22] Filed: Dec. 17, 1970

[21] Appl. No.: 99,211

[30] Foreign Application Priority Data

Dec. 17, 1969 Germany..........P 19 63 303.5

[52] U.S. Cl................................177/210, 73/DIG. 1
[51] Int. Cl. .............................................G01g 3/14
[58] Field of Search....177/210, 1; 73/DIG. 1, 141 A, 73/141 R, 67.2

[56] References Cited

UNITED STATES PATENTS 3,411,347  11/1968  Wirth et al..............73/DIG. 1

Primary Examiner—Richard B. Wilkinson
Assistant Examiner—George H. Miller, Jr.
Attorney—Ernest F. Marmorek

[57] ABSTRACT

A flat vibrating measuring string or ribbon suitable for use with a vibrating string weighing apparatus. The cross-section of the string is selected with such a large ratio of the largest to the smallest cross-sectional axis that the resonant frequencies of the desired mth vibrating mode in the direction of the minimum bending rigidity are situated below the resonant frequencies of the first mode in the transverse direction. The string is also enlarged at its ends, preferably by means of interconnecting rounded portions, to minimize the peak stress where the string is clamped. To further minimize the tension at the ends of the string where they are clamped, the string is secured to a junction mass having a resistance and modulus of elasticity which is within an order to magnitude of that of the string.

13 Claims, 5 Drawing Figures

FLAT VIBRATING MEASURING STRING

BACKGROUND OF THE INVENTION

This invention relates generally to a flat vibrating measuring string or ribbon, and particularly relates to such a string suitable for use with a vibrating string weighing apparatus.

A vibrating measuring string of this type is known from German Pat. No. 1,281,695. This known string has a cross-section which is not circular. For a ribbon-like string, the cross-section may be rectangular. In this case, the ratio of the axes of the mean inertia ellipse of the cross-section along the string is so selected that, within the operating range of the load, the two resonant frequencies of the same order, one of which is used for the measurement, differ from each other in the direction of the two main axes of the inertia ellipse of the cross-section by more than their resonance width, but are disposed between the resonant frequencies of adjacent orders or modes.

Such an arrangement has the result that generally only those resonant frequencies occur in vibration which are to be used for the measurement. The resonant vibration in the transverse direction is suppressed because excitement of these vibrations by mechanical or other coupling is unlikely for the selected arrangements. This procedure is useable when the form of the cross-section of the flat vibrating string, which includes the influence of tolerance limits, is brought into coincidence on the basis of exact calculations with the required conditions. However, for higher orders of the resonant vibrations and particularly for a large width of the frequency band of the string, this turns out to be rather difficult. Errors may result in coupled vibrations and corresponding disturbance in the functional relationship between the resonant frequency and the tensile stress acting on the string. Particularly for the utilization of the measuring string in a vibrating string weighing device, this is not admissible.

It is accordingly an object of the present invention to provide a vibrating measuring string which overcomes the disadvantages of the prior art.

A further object of the invention is to provide a vibrating string having an operating frequency for the measurements which is further removed from the possible resonant frequencies in the transverse direction and therefore to substantially inhibit the possibility of the excitement of coupled vibrations in the transverse direction.

SUMMARY OF THE INVENTION

In accordance with the present invention, a vibrating string is used having a cross-section with such a large ratio of the largest to the smallest cross-sectional axis that the resonant frequencies of the desired mth vibrating mode in the direction of the minimum bending rigidity are situated below the resonant frequency of the first mode in the transverse direction. Accordingly, for a vibrating string embodying the invention, the resonant frequencies are no longer adjacent to and between the resonant frequencies of adjacent orders. Thus, the operating frequency is situated below the resonant frequency of the first order or mode in the transverse direction. Therefore, it is no longer possible that the operating frequency excites a resonant vibration in the transverse direction. This is particularly true when the vibrating mode $m \geq 2$ is used for the measurement. Suitably, the ratio of the largest to the smallest cross-sectional axis is selected to be $m^2$. Even better results are obtained when the ratio of the largest to the smallest cross-sectional axis is selected to be $2m^2$ or even larger. Assuming one operates with a vibrating mode $m = 3$, then the length of the large cross-sectional axis is about 20 times the length of the smallest cross-sectional axis.

The measuring string in accordance with the invention may have any desired form which satisfies the conditions just outlined. However, it is advantageous to select a string having the shape of a flat ribbon with a rectangular cross-section. Such a string or ribbon is easily manufactured. Furthermore, clamping of the ends of the string presents the least difficulties.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENTS

Figure 1:
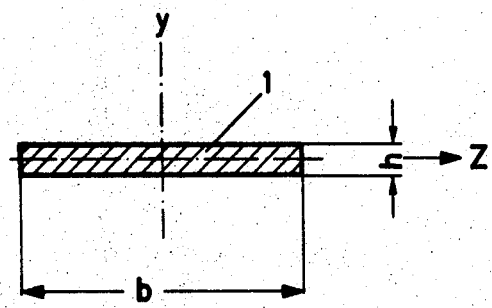
FIG. 1 is a cross-sectional view, on enlarged scale, of a ribbon-shaped vibrating measuring string in accordance with the present invention.

FIG. 1 is a cross-sectional view of a ribbon-like measuring string in accordance with the invention. A coordinate system having axes Y and Z is also shown. The string 1 has a large cross-sectional axis with the length $b$ in the direction of the Z-axis and a small cross-sectional axis having a length $h$ in the direction of the Y-axis. It is desired that the string 1 vibrate in the direction of the minimum bending rigidity; that is, in the direction of the Y-axis in the mth mode. This operating frequency of the mth order is now situated below the resonant frequency of the first order in the transverse direction; that is, in the direction of the Z-axis, because, in accordance with the invention, the length $b$ of the largest cross-sectional axis is chosen much larger than the length $h$ of the smallest cross-sectional axis in the vibrating direction.

As previously explained, the distance of the measuring frequency from the first resonant frequency in the transverse direction is to be made as large as possible. This, in turn, yields the "admissible tensile stress" which is not identical with the admissible tension in the sense of the strength of materials and therefore must be separately investigated. The admissible tensile stress in the sense of the strength of materials can be calculated, or more simply and safely can be determined by life tests under operating conditions. In order to avoid the peak stresses at the junction places, that is where the string is clamped, there are provided in accordance with the invention enlargements of the ribbon at the ends of the string which are connected with the string by rounded or curved portions such as are known from the material testing technique for draw bars to avoid breaking at the cross-section of the junction and thereby a falsifying of the test results. These rounded or curved portions suitably have a radius which is about equal to the width of the ribbon of the measuring string. Occasionally, and for different reasons, it may be advantageous to use smaller radii of the rounded transition portions. In this case, there results a smaller decrease of the peak stress. The effects of the rounded portions on the functional relationship between the vibrating frequency and the load of the measuring string are most simply determined experimentally. The exact relationship between the load and the frequency in any case is only obtained by the final adjustment or calibration.

Figure 2:
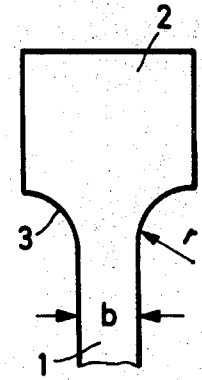
FIG. 2 is a plan view of one end portion of the measuring string of the invention, the end portion being intended to be clamped.

Such an end portion of the measuring string is shown in FIG. 2, to which reference is now made. The ribbon-like enlargement 2 at the ends of the string 1 which is to be used for clamping the measuring string is reduced to the smaller width b of the measuring string 1 by means of the curved portion 3. The curved portion 3 has a radius r which is preferably selected approximately equal to the width b of the string 1.

In general, the measuring string is clamped at its ends to a junction mass so that it is secure against bending. Simple clamping could be sufficient from the point of view of mechanical resistance. However, such arrangement operates as a strong damping force to damp the vibrations. Accordingly, clamping masses are made from a material having a resistance and modulus of elasticity which is within an order of magnitude of the corresponding values of the material of the string. The junction mass is conventionally connected with the string by soldering. This now causes, at the edges of the string, peak stresses which may be minimized by the rounded or curved portions above described and illustrated in FIG. 2. If, however, such curved portions cannot be used, the peak stress may be minimized by not soldering the string to the junction mass, but by connecting it with a synthetic adhesive material. Such synthetic adhesive have a modulus of elasticity which is smaller by one or two orders of magnitude than that of the material of the string. In accordance with the invention, the entire junction mass is made of a synthetic material, or at least provided with a "straight-glued joint" of suitably selected strength. In this manner, the peak stresses which exist in the string at the junction point are minimized and the transition of the string stress to the junction mass is shifted a greater distance behind the junction point.

Further in accordance with the invention, the thickness of the glued joint is made variable by curving the boundaries of the joint. A wedge-shaped glued joint is particularly simple to make; however, glued joints of equal thickness or strength may also be used. The effects of the glued joints on the vibrating properties of the string may best be determined experimentally or during the calibration.

Figure 3:
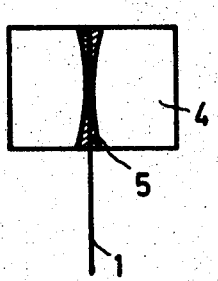
FIGS. 3 to 5 are side elevational views of various clamping arrangements for the measuring string of the invention.
Figure 4:
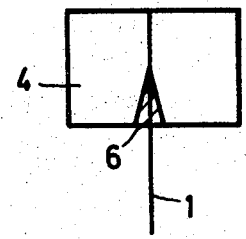
Figure 5:
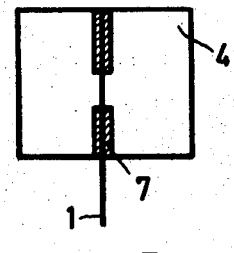

FIGS. 3 to 5, to which reference is now made, illustrate different possibilities of clamping the measuring string 1 in glued joints according to the principles just outlined. In the junction mass 4, there is provided a recess forming a joint which is enlarged towards the clamping point or which, in any case, has a greater width at this point. The joint or recess is filled with a hardenable synthetic adhesive. FIG. 3 illustrates a glued joint 5 having outwardly curved portions which almost touch each other within the interior of the junction mass or blocks 4. In FIG. 4, there is shown a wedge-shaped glued joint 6, and in FIG. 5, a joint 7 of equal or uniform thickness. The glued joints extend to or nearly to the center of the junction mass. They shift the transition of the force tensioning the string from the edge of the junction mass into the junction mass.

What is claimed is:

1. A flat vibrating measuring string, particularly suitable for a vibrating weighing device, said string having a cross-section which is not round and having such a large ratio of the largest to the smallest cross-sectional axes that the resonant frequencies of a desired vibration mode $m \geq 2$ in the direction of the minimum bending rigidity are situated below the resonant frequency of the first mode in the transverse direction.

2. A string as defined in claim 1 wherein the ratio of the largest to the smallest cross-sectional axis is larger than $m^2$.

3. A string as defined in claim 1 wherein the ratio of the largest to the smallest cross-sectional axis is at least $2m^2$.

4. A string as defined in claim 1 wherein said string has the shape of a flat ribbon with a rectangular cross-section.

5. A string as defined in claim 1 wherein junction masses of synthetic material are provided for clamping the ends of said string.

6. A string as defined in claim 5 wherein said junction masses are each provided with a recess filled with a hardenable adhesive to provide a glued joint for said string.

7. A string as defined in claim 6 wherein said recess in said junction masses has a curved shape with an interior region where the boundaries of said recess are closely adjacent to each other.

8. A string as defined in claim 6 wherein said recess is wedge-shaped.

9. A string as defined in claim 8 wherein said recess extends substantially to the center of each of said junction masses.

10. A string as defined in claim 6 wherein said recess is of substantially rectangular cross-section.

11. A string as defined in claim 10 wherein said recess extends substantially to the center of each of said junction masses.

12. A flat vibrating measuring string, particularly suitable for a vibrating measuring device, said string having the shape of a flat ribbon with a rectangular cross-section and having such a large ratio of the largest to the smallest cross-sectional axes that the resonant frequencies of a desired vibration mode m in the direction of the minimum bending rigidity is situated below the resonant frequency of the first mode in the transverse direction, wherein said string is provided at each of its ends with a ribbon-like enlargement for securing the ends of said string and wherein said string has curved portion between said string and said enlargements.

13. A string as defined in claim 12 wherein said curved portions have a radius which approximately equals the width of said string.

* * * * *